United States Patent
Balnaves et al.

(10) Patent No.: US 6,954,894 B1
(45) Date of Patent: Oct. 11, 2005

(54) METHOD AND APPARATUS FOR MULTIMEDIA EDITING

(75) Inventors: James Anthony Balnaves, North Ryde (AU); John Charles Brook, Stanhope Gardens (AU); Julie Rae Kowald, Newport (AU); Rupert William Galloway Reeve, Redfern (AU); John Richard Windle, Hebersham (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/407,293

(22) Filed: Sep. 29, 1999

(30) Foreign Application Priority Data

Sep. 29, 1998 (AU) .............................................. PP6246

(51) Int. Cl.[7] .......................... G06F 17/21; G06F 17/00
(52) U.S. Cl. .................... 715/500.1; 715/513; 715/723
(58) Field of Search .............................. 707/500.1, 513; 345/723; 715/500.1, 513, 723

(56) References Cited

U.S. PATENT DOCUMENTS

| | | | | | |
|---|---|---|---|---|---|
| 5,589,945 A | * | 12/1996 | Abecassis | .................... | 386/83 |
| 5,608,859 A | * | 3/1997 | Taguchi | ................... | 707/500.1 |
| 5,732,184 A | * | 3/1998 | Chao et al. | .................... | 386/55 |
| 5,760,767 A | * | 6/1998 | Shore et al. | ................ | 345/723 |
| 5,781,188 A | * | 7/1998 | Amiot et al. | ................ | 345/723 |
| 5,786,814 A | * | 7/1998 | Moran et al. | ................ | 345/720 |
| 5,889,519 A | * | 3/1999 | Boezeman et al. | ......... | 345/723 |
| 5,969,716 A | | 10/1999 | Davis et al. | ................ | 345/328 |
| 5,999,173 A | * | 12/1999 | Ubillos | ....................... | 345/724 |
| 6,005,560 A | * | 12/1999 | Gill et al. | ................ | 707/500.1 |
| 6,038,573 A | * | 3/2000 | Parks | ......................... | 707/513 |
| 6,137,483 A | * | 10/2000 | Kiyono et al. | ........... | 707/500.1 |
| 6,144,375 A | * | 11/2000 | Jain et al. | ................ | 707/500.1 |
| 6,353,461 B1 | * | 3/2002 | Shore et al. | ................ | 348/722 |
| 6,480,665 B1 | * | 11/2002 | Hamada | ...................... | 386/52 |
| 6,686,918 B1 | * | 2/2004 | Cajolet et al. | .............. | 345/473 |

OTHER PUBLICATIONS

Ackermann, Philipp , "Direct Manipulation of Temporal Structures in a Multimedia Application Framework", Oct. 1994, ACM Multimedia 94, pp. 51–58.*

Microsoft Press,"Computer Dictionary", 1997, 3rd Edition, p. 305.*

* cited by examiner

*Primary Examiner*—Heather R. Herndon
*Assistant Examiner*—Almari Yuan
(74) *Attorney, Agent, or Firm*—Fitzpatrick, Cella, Harper & Scinto

(57) ABSTRACT

A method for production and post-production processing of multi-media input data where the method comprises the steps of inputting one or more multi-media input data sets inputting one or more templates and applying the one or more templates to the one or more input data sets so to produce a processed output data set for storage, and/or display and/or further processing.

29 Claims, 19 Drawing Sheets

| Selection and Extraction Method Examples |||
| --- | --- | --- |
| Selected Portion Start | Extracted Duration | Relationships between Selections |
| Within whole content. | Random. | Random, chronological, without overlap. |
| Within clip. | Less than or equal to clip length. | Random, chronology ignored, overlap ignored. |
| Within a group of clips. | Spanning one or more clips recorded within the same day. | From separate clips. |
| Heuristically obtained, eg. assume zones of interest in recorded content occur primarily near clip startpoints. | Heuristically obtained, eg. related to human attention span. | From a group of clips recorded within the same day. |
| Multi-pass (repetitious) | Limited so as to limit total output duration (eg. based on heuristics). | From all clips within whole content. |
| | Short durations followed by longer durations (eg. applied to multipass selection) | Repetitious, for instance, to lengthen output content duration with respect input content duration. |

Fig. 8

| Ordering Method Examples |
| --- |
| Sequential or chronological |
| Random |
| Reverse-chronological |
| Flashback (later chronologies displayed or duplicated early in the order) |
| Montage (later chronologies displayed in brief early in the order) |
| Cutaway (two related or consecutive portions separated by an unrelated or distant portion) |
| Alternate |

Fig. 9

| Assembly Method Examples |
| --- |
| Cut (butt-edit) |
| Short Dissolve |
| Long Dissolve |
| Fast Wipe |
| Slow Wipe |
| Graphic |

Fig. 10

| Effects Mapping Examples |
| --- |
| Addition of Sound effect |
| Removal of chrominance |
| Addition of artificial scratches and dust |
| Composition or overlay of sprites, animation, graphics |
| Addition of Music |
| Luminance or chrominance keying or matteing |
| Dissolve or mixing of other content |

Fig. 11

| Silent Movie Template Components Example ||
| --- | --- |
| Component | Purpose |
| Four well-separated random video selections from input content. | Selection of sufficiently differing activities or incidents from the input content to create surprise or reduce boredom. |
| Extract limited duration clips for each selection, each preferably less than 2 minutes in duration. | Limit clip duration to the effective viewer attention span and avoid boredom. |
| Filter clips to remove all chrominance information. | Replicate "black and white" characteristic of Silent Movie genre. |
| Remove original audio information. | Replicate silent characteristic of Silent Movie genre. |
| Add piano soundtrack. | Replicate characteristic of Silent Movie genre. |
| Insert dialogue mattes at clip boundaries. | Replicate characteristic of Silent Movie genre. |
| Apply scratch and dust filter. | Replicate characteristic of Silent Movie genre. |
| Cut in titles, dialogue mattes and clips. | Replicate hard-cut characteristic of Silent Movie genre. |
| Insert fade-in from black to title dialogue matte. | Include title in characteristic style of Silent Movie genre. |
| Insert fade-out to black from end-title dialogue matte. | Include end-title in characteristic style of Silent Movie genre. |
| Insert film projector sprocket hole sound over title. | Replicate projector sound-effect characteristic of Silent Movie genre. |

| Example Associations between Editing & Effect Techniques and Template Type |||||
|---|---|---|---|---|
| | Romance Montage | Action Montage | Continuity Template | Silent Movie |
| Transitions | | | | |
| Fade | | | | |
| Fade out | ✓ | | ✓ | ✓ |
| Fade in | ✓ | | ✓ | ✓ |
| Dissolve | ✓ | | | |
| Cross-fades | ✓ | | ✓ | |
| Wipe | | ✓ | | |
| Quick/Whip | | ✓ | | |
| Audio | ✓ | | ✓ | |
| Sound Types | | | | |
| Actual Sound | ✓ | ✓ | ✓ | |
| Sound effects | ✓ | ✓ | ✓ | ✓ |
| Atmos sound | ✓ | ✓ | ✓ | ✓ |
| Voice over | ✓ | ✓ | ✓ | |
| Cuts | | | | |
| Cross cut | ✓ | ✓ | | |
| Continuity cut | ✓ | ✓ | ✓ | ✓ |
| Compilation cuts | | ✓ | | |
| Split editing | ✓ | | ✓ | |
| Parallel cutting | | | | |
| Classical cutting | ✓ | | ✓ | ✓ |
| Editing effects | | | | |
| Cutaways | ✓ | ✓ | ✓ | |
| Insert | ✓ | ✓ | ✓ | |
| Subliminal cuts | | | | |
| Flashbacks | | ✓ | ✓ | |
| Freeze-frames | ✓ | ✓ | | |
| Frequency | ✓ | ✓ | | |
| Duration | | | | |
| Montages | ✓ | ✓ | | |
| Rhythm | ✓ | ✓ | ✓ | |
| Reverse shot | ✓ | ✓ | ✓ | |
| Shot length | | | | |
| Same length | | | ✓ | |
| Slow cutting | ✓ | | | |
| Fast cutting | ✓ | ✓ | | |
| Cut to beat/music | ✓ | ✓ | | |

Fig. 14A

Movie Director Example Implementation (Pseudo-code)

```
main()
begin
        create rule list
        create parameter list
        create item list
        create rule syntax table get template file name
        load(template_file_name)

get render script file name
        create render script file get input content file names
        create content list
        contentparse(content_list, input_content_file_names,...)

ruleparse(installed_rules, content_list, render_script_file)
        save render_script_file
        close render_script_file
        exit
end load(template_file_name)
begin
        while(not end of template_file)
        begin
                get next item
                if (item_type == reference)
                        resolve(item)
                else if (item_type == rule)
                        install rule_name
                else if (item_type == parameter)
                        write(parameter_list, parameter_name)
                else if (item_type == rule_syntax_extension)
                        write(rule_syntax_table, rule_syntax_extension)
                else
                        write(item_list, item_name)
        end
end resolve(reference_name)
begin if (reference_type == provided_content)
```

Fig. 14B

```
                begin
                        get provided content file name
                        contentparse(content_list, provided_content_file_name)
                end
                else
                        get referenced item
        end
end contentparse(content_list, content_file_name, ...)
begin
        while(not last content item)
        begin
                if (content_file_name_type == directory)
                        begin
                        get directory contents
                        contentparse(content_list,
                                        directory_content_file_names,...)
                        end
                else
                        begin
                        get content information
                        write(content_list, content_file_name, content_information)
                        end
        end
end ruleparse(rule_list, content_list, render_script_file_name)
begin
        create instruction list
        while (not last rule)
        begin
                get rule
                decode(instructions, operands, rule, content_references,
                                parameter_references, item_references)
        end get instruction list
        while (not last instruction)
        begin
                execute instruction(operands)
        end
end decode(instructions, operands, rule, content_references, parameter_references,
                item_references)
begin
        while (not end of rule)
```

```
begin
    get next portion
    if (portion_type == instruction)
        begin
        read(portion)
        convert portion according to rule syntax table
        write(instruction_list, instruction)
        end
    else
        begin
        read(reference)
        convert portion according to rule syntax table
        write(instruction_list, operand)
        end
    end
end
```

Movie Builder Example Implementation (Pseudo-code)

```
main()
begin
        get render script file name
        get destination movie file name
        open render script file
        create qt_movie_file
        parse(render_script_file, qt_movie_file)
        close render_script_file
        save qt_movie_file
        close qt_movie_file
        exit
end parse(script_file_name, qt_movie_file)
begin
        while(not end of script_file)
        begin
                get next script file line
                parse_line(script_file_line, qt_movie_file)
        end
end parse_line(script_file_line, qt_movie_file)
begin
        get first word of line
        if "//" return
        else if "video" then
                video(script_file_line, qt_movie_file)
        else if "audio" then
                audio(script_file_line, qt_movie_file)
        else if "transition" then
                transition(script_file_line, qt_movie_file)
```

```
            else
                    flag error in script file
    end video(script_file_line, qt_movie_file)
begin
        parse video paramenters
        add video to qt_movie_file using QT API
end audio(script_file_line, qt_movie_file)
begin
        parse audio paramenters
        add audio to qt_movie_file using QT API
end transition(script_file_line, qt_movie_file)
begin
        parse transition paramenters
        add transition to qt_movie_file using QT API
end
```

Fig. 15B

Template Example Implementation (Pseudo-code)

```
//Action Template                          Fast-paced, quick cutting, fast beat.
cut_order = chronological                  //chronology not strictly enforced
structure = 10s, 4s, ...                   //repetitive temporal structure
intraclip_cutting = 2                      //one long clip may contribute 2 elements
intraclip_spacing = 2s
avoid_cutting = 1s, -1s                    //do not use first/last second of clip
cut_method = random, clip
play_order = forward
structure_transition = 3, 4, crossfade     //3-4 frame crossfade
beat_synchronise = true                    //sync video clip lengths to music beat
back_track = action                        //specify backing music characteristics
audio_action = mute_all                    //remove all original audio
title = action_title
end_title = action_end_title //function definition length check_fit(content-length, structure, intraclip_spacing, intraclip_cutting,
                 avoid_cutting)
begin
        length = content_length - avoid_cutting[0] + avoid_cutting[1] - structure[0]
        x = intraclip_cutting
        while (x > 1)
        begin
                x = x - 1
                length = length - structure[x] - intraclip_spacing[x]
        end
        return length
end
```

Fig. 16A

```
main()            //start
begin
        trim (title, beat_synchronise, structure_transition)
        assemble_edit (output, title, play_order, structure_transition, audio_action,
                        back_track)
        while not (completed content list)
        begin
                get next content (cut_order)
                excess = check_fit (content_length, structure, intraclip_cutting,
                                intraclip_spacing, avoid_cutting)
                if (excess > 0)
                begin
                        y = 0
                        cut_start = cut_method(excess)
                        cut_end = 0
                        while (y < intraclip_cutting)
                        begin
                                cut_end = cut (avoid_cutting + cut_start + cut_end,
                                                structure[y])
                                y = y + 1
                                cut_start = excess - cut_start
                        end
                end trim (current_clips, beat_synchronise, structure_transition)
                assemble_edit (output, current_clips, play_order, structure_transition,
                                audio_action, back_track)
        end
        trim (end_title, beat_synchronise, structure_transition)
        assemble_edit (output, end_title, play_order, structure_transition, audio_action,
                        back_track)
end //finish
```

Fig. 16B

METHOD AND APPARATUS FOR MULTIMEDIA EDITING

FIELD OF THE INVENTION

The present invention relates to multimedia and video and audio editing and, in particular: to the method of automated or semi-automated production of multimedia, video or audio from input content through the application of templates; and also to the method of directing, controlling or otherwise affecting the application of templates and production of multimedia, video or audio through use of information about the input content.

BACKGROUND TO THE INVENTION

Techniques and tools exist for the editing, post-production and also creation of multimedia and video and audio productions or presentations. These techniques and tools have traditionally developed in the movie and video industries where sufficient finances and expertise have allowed and directed development of highly flexible tools but which require considerable planning and expertise and often multi-disciplinary expertise in order to complete a production at all, let alone to a standard level of quality.

Over time these tools have been simplified and reduced in capability and cost and several examples are now available in the consumer and hobbyist marketplace, typically for use on home computers and often requiring significant investment in computer storage, system performance, accelerator or rendering hardware and the like. Typically, any one tool is insufficient to complete a product or to complete a production to the required standard, therefore requiring investment in several tools. Furthermore, these tools are configured to require sufficient expertise to understand them and there is also a requirement to learn how to use the techniques. That is, the user must have or gain some expertise in the various disciplines within multimedia, video and audio postproduction. The state-of-the-art tools do not typically provide such expertise. Furthermore, there is a known requirement for collaboration of the multi-disciplined team tasked with creating a multimedia, video or audio production. Said collaboration is typically a complex process and those unskilled in the art but wishing to create such a production find it difficult or impossible to achieve.

It is an object of the present invention to ameliorate one or more disadvantages of the prior art.

SUMMARY OF THE INVENTION

According to a first aspect of the invention, there is provided a method of processing at least one data set of multi-media input information, said data set comprising at least one of video data, still-image data, and audio data, the method comprising the steps of:

determining first meta-data from at least one of said data set, and second meta-data associated with said at least one data set;

determining, depending upon the first meta-data, a set of instructions from a template; and applying the instructions to the input data set to produce processed output data.

According to a second aspect of the invention, there is provided a method of processing at least one data set of multi-media input information, said data set comprising at least one of video data, still-image data, and audio data, the method comprising the steps of:

determining first meta-data from at least one of said data set, and second meta-data associated with said at least one data set; and determining, depending upon the first meta-data, a set of instructions from a template.

According to a third aspect of the invention, there is provided a method of processing at least one data set of multi-media input information, said data set comprising at least one of video data, still-image data, and audio data, the method comprising the steps of:

applying a template to the input data set, whereby the template comprises a temporal mapping process, and whereby the template is constructed using heuristic incorporation of experiential information of an expert, and whereby the applying step comprises the sub-step of;

applying the temporal mapping process to the input data set to produce modified temporally structured processed output data.

According to a fourth aspect of the invention, there is provided a method of processing at least one data set of multi-media input information, said data set comprising at least one of video data, still-image data, and audio data, the method comprising the steps of:

applying a template to the input data set, whereby the template comprises at least each of a temporal mapping process and an effects mapping process, and whereby the template is constructed using heuristic incorporation of experiential information of an expert, and whereby the applying step comprises the sub-steps of;

applying the temporal mapping process to the input data set to produce modified temporally structured data; and applying the effects mapping process to the modified temporally structured data to produce the processed output data.

According to a fifth aspect of the invention, there is provided an apparatus for processing at least one data set of multi-media input information, said data set comprising at least one of video data, still-image data, and audio data, the apparatus comprising;

capture means adapted to capture the input data set;

first determining means for determining first meta-data from at least one of said data set, and second meta-data associated with said at least one data set;

second determining means for determining, depending upon the first meta-data, a set of instructions from a template; and application means for applying the instructions to the input data set to produce processed output data, wherein said first and second determination means, and said application means are housed on board the capture means.

According to a sixth aspect of the invention, there is provided an apparatus for processing at least one data set of multi-media input information, said data set comprising at least one of video data, still-image data, and audio data, the apparatus comprising;

capture means adapted to capture the input data set;

first determining means for determining first meta-data from at least one of said data set, and second meta-data associated with said at least one data set;

second determining means for determining, depending upon the first meta-data, a set of instructions from a template; and application means for applying the instructions to the input data set to produce processed output data, wherein said first and second determination means, and said application means are distributed between the capture means and an off-board processor.

According to a seventh aspect of the invention, there is provided a computer readable memory medium for storing a program for apparatus which processes at least one data set of multi-media input information, said data set comprising at least one of video data, still-image data, and audio data, the program comprising;

code for a first determining step for determining first meta-data from at least one of said data set, and second meta-data associated with said at least one data set;

code for a second determining step for determining, depending upon the first meta-data, a set of instructions from a template; and code for an applying step for applying the instructions to the input data set to produce processed output data.

According to a eighth aspect of the invention, there is provided a computer readable memory medium for storing a program for apparatus which processes at least one data set of multi-media input information, said data set comprising at least one of video data, still-image data, and audio data, the program comprising;

code for a first determining step for determining first meta-data from at least one of said data set, and second meta-data associated with said at least one data set; and code for a second determining step for determining, depending upon the first meta-data, a set of instructions from a template.

BRIEF DESCRIPTION OF THE DRAWINGS

A number of preferred embodiments of the present invention will now be described with reference to the drawings in which:

FIG. 8 presents preferred examples of the selection and extraction process;

FIG. 9 illustrates preferred examples for the ordering process;

FIG. 10 presents preferred examples for the assembly process;

FIG. 11 illustrates examples of effects mapping;

FIG. 12 depicts a template for a silent movie;

FIG. 13 illustrates associations between editing and effect techniques and template type;

FIGS. 14A–14C present a pseudo-code representation of a movie director module;

FIGS. 15A and 15B present a pseudo-code representation of a movie builder example; and FIGS. 16A and 16B illustrate a typical template in pseudo-code for an action movie.

DETAILED DESCRIPTION

First Preferred Embodiment of the Method

Some of the typically poor features of consumer video, that are typically visible or obvious or encountered during presentation of said consumer video, may be reduced in effect or partially counteracted by automatic application of techniques derived from, or substituting for, typical movie-making or video-making techniques. These derived, or substitute, techniques can include techniques that are relatively unsophisticated compared to those typically applied in the movie-making industry. Furthermore, these relatively unsophisticated techniques, upon application to a consumer video or multimedia recording or presentation can provide a positive benefit to the said video recording or multimedia presentation, or parts thereof.

Figure 1:
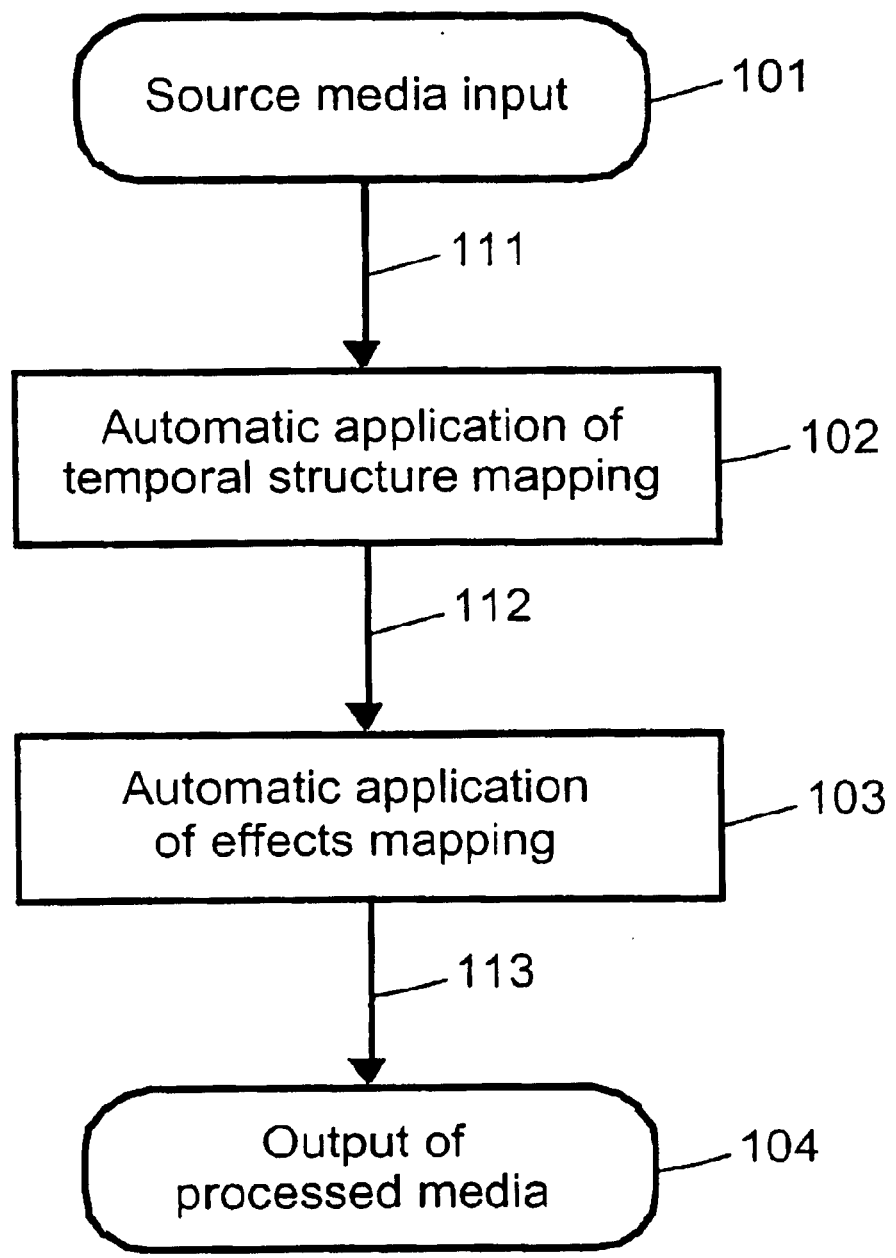
FIG. 1 depicts a typical application of derived movie-making techniques.

FIG. 1 indicates an example system for automatic application of derived or substitute movie-making techniques to an input source content, typically a consumer audio/video recording or multimedia recording or presentation. Said derived or substitute movie-making techniques are, or may be typically applied in two sequential steps to the said input source content, as shown in FIG. 1, resulting in the output of processed content that is presented or played or stored in preference to or in replacement of the said input source content. The intention of the embodiment is to provide a user with an improved presentation or recording by offering the user the possibility of using the output (processed) content in substitution for the input source content. Said improvements may include or may only include reductions in poor quality features of the said input source content.

It is the intention of the embodiment to operate on or process the provided input source content and not to require or force the user to provide or source or record additional or replacement or improved input source content in order to effect the quality improvement or reduction in poor features claimed for the invention. The embodiment is, however, not restricted from utilizing other, or additional, or replacement input source content or other content sources in order to achieve the stated goal of improvement of quality or reduction of poor features in the output content, in comparison with the input source content.

The process indicated in FIG. 1 includes steps: 101, input of source content; 102, automatic application of temporal structure mapping; 103, automatic application of effects mapping; and 104, output of processed content.

FIG. 1 step 101 may involve any reasonable method known in the art for input or capture of source content into a form suitable for subsequent processing by an automatic hardware or software or combined system, typically a general purpose computer system as described below with reference to FIG. 7. Such methods may include digitisation of analogue data, or may include reading a digitised serial data stream, for instance, sourced by a Camcorder or DVCamcorder device, and may include format conversion or compression or decompression, or combinations thereof as well as, typically, writing of the digitised, converted or reformatted data, 111, to a suitable storage medium within the aforementioned automatic system ready for subsequent processing at 102.

FIG. 1 step 102 involves the optional mapping of the temporal structure, or part thereof, of the stored input source content to a new temporal structure, or part thereof, output at 112. Step 102 is a processing step involving modification of the temporal structure of said input content, 111, to obtain said output content, 112, where said mapping process may include the reduced case of identity mapping (that is, no changes are introduced). Typically, more useful mapping processes, singular, or plural, may be involved in FIG. 1 step 102 and these are described herein as both preferred embodiments or parts thereof of the invention as well as being examples, without restriction, of embodiment of the invention.

Figure 2:
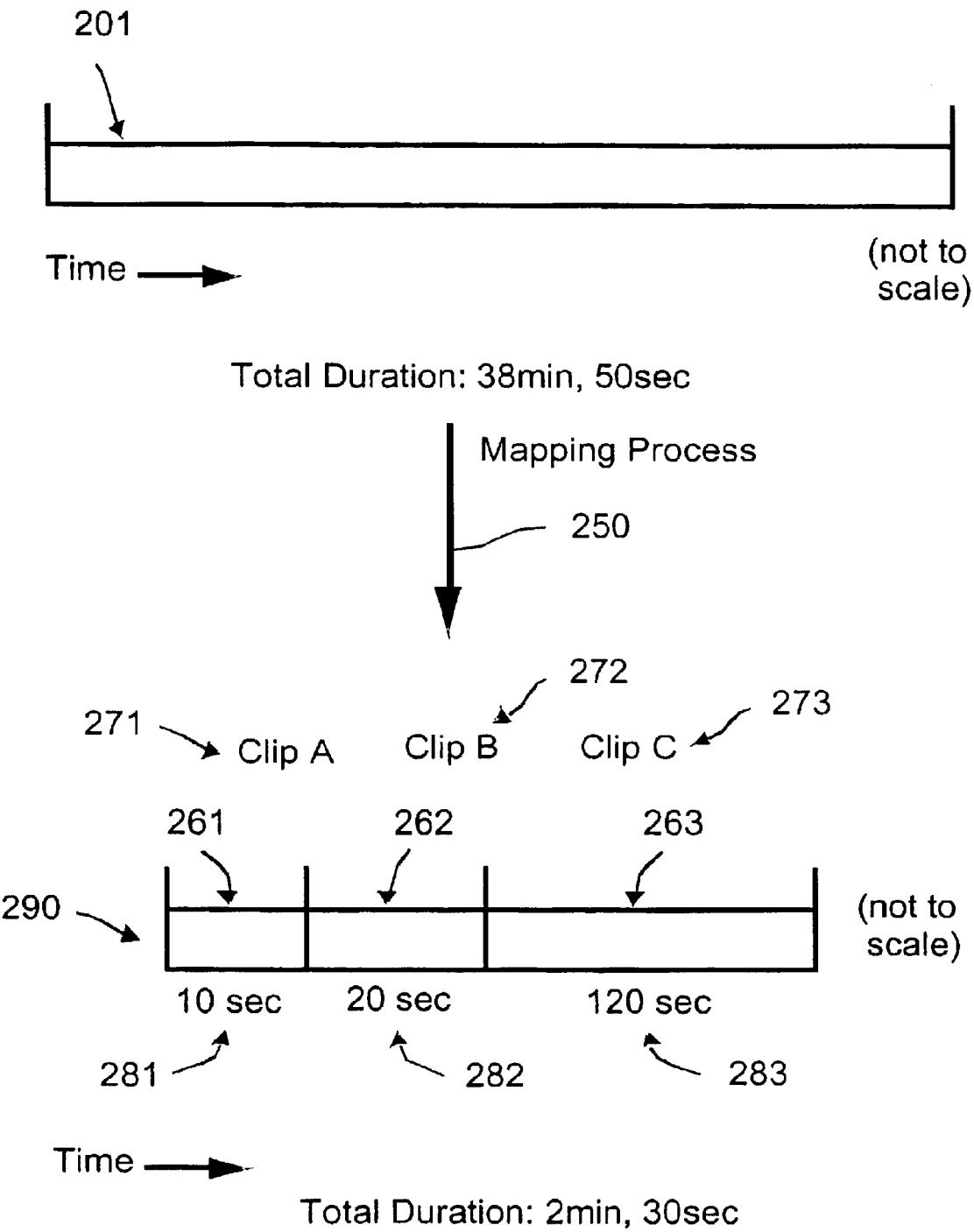
FIG. 2 shows a first example of a temporal structure mapping process.
Figure 4:
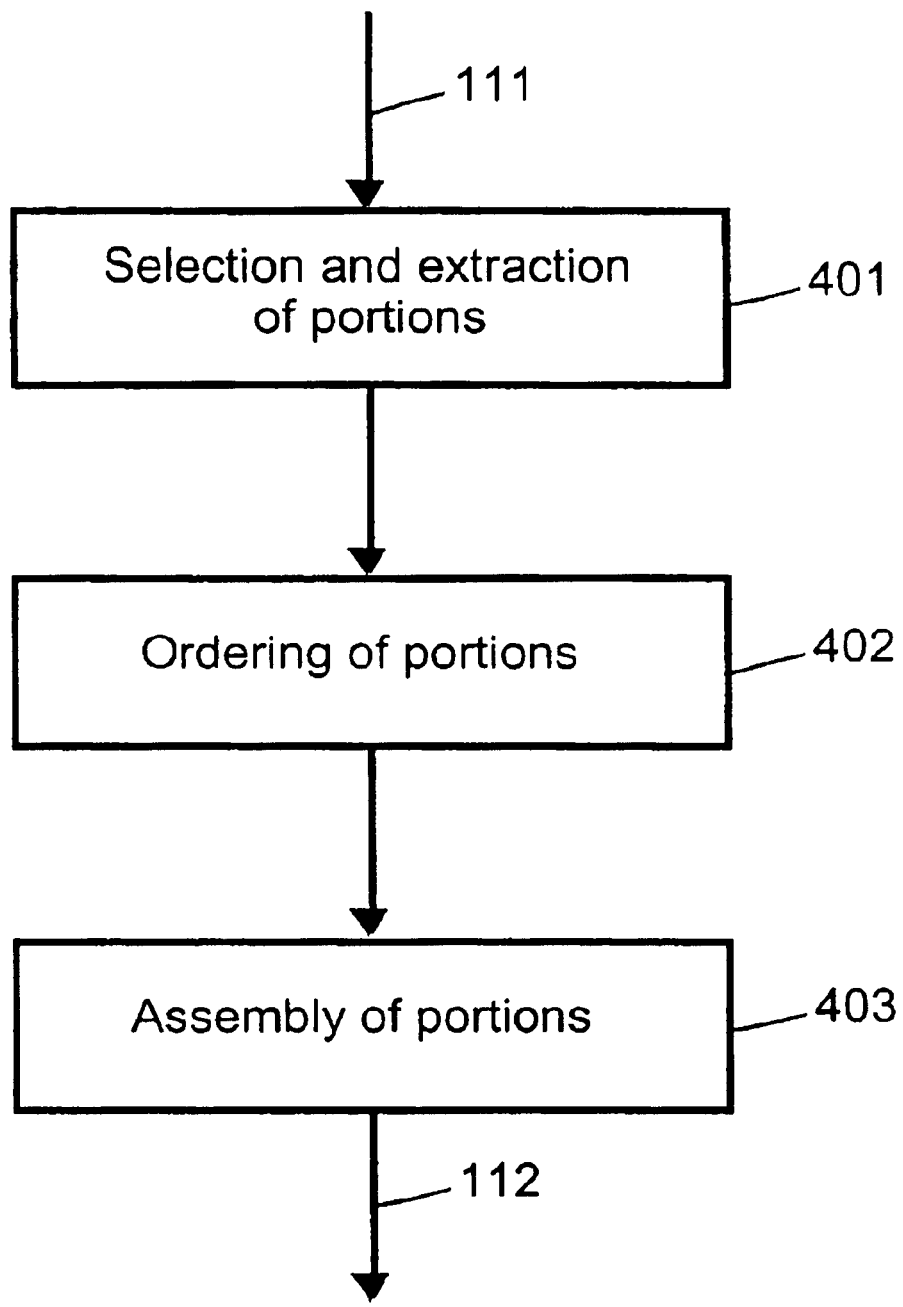
FIG. 4 depicts mapping process steps in more detail.

A first example of a useful temporal structure mapping process that may be implemented in FIG. 1 step 102, is shown diagrammatically in FIG. 2. This first example mapping process involves the reduction of the duration of the content 111, from FIG. 1 step 101 when mapped to the output content, 112, as well as a consequent overall reduction in the duration of the entire content presentation. The example in FIG. 2 assumes a retention of chronological ordering of the input source content, 111, when mapped to the output content, 112. The input content comprises one whole temporal element, 201, about which little or nothing may be known by the automatic system regarding the temporal structure other than, typically, the total duration of the content, 111. This content may typically comprise video and audio information previously recorded and now provided by the user, as well as possibly including still images and other multimedia elements. This content may even have been previously processed or even artificially generated, in which case a variety of content types may be included. In this first example of the temporal structure mapping process, 250, the automatic system may select portions of the input content and reassemble these. The important feature of the mapping process in this example is the reduction of overall duration of the output content, 112, in comparison with the duration of the input content, 111. This automatic reduction of duration of source content can be one of several significant techniques for reducing the poor features of said source content or, conversely, for increasing the positive perceptual quality of said source content when it is presented to viewers. The mapping process, 250, in FIG. 2, in this first example, may typically comprise steps of: selection and extraction FIG. 4, 401, of a number of content portions, for instance, 261, 262, 263, from 201, which is a timeline representation of input content 111 in FIG. 1; ordering FIG. 4, 402, of content portions, 261, 262, 263, which in this first example involves retention of the same sequencing or chronology of the extracted portions as was present in 201; and assembly FIG. 4, 403, of extracted portions 261, 262, 263, to yield the output content, 112, shown in FIG. 2 in a timeline representation, 290.

Figure 3:
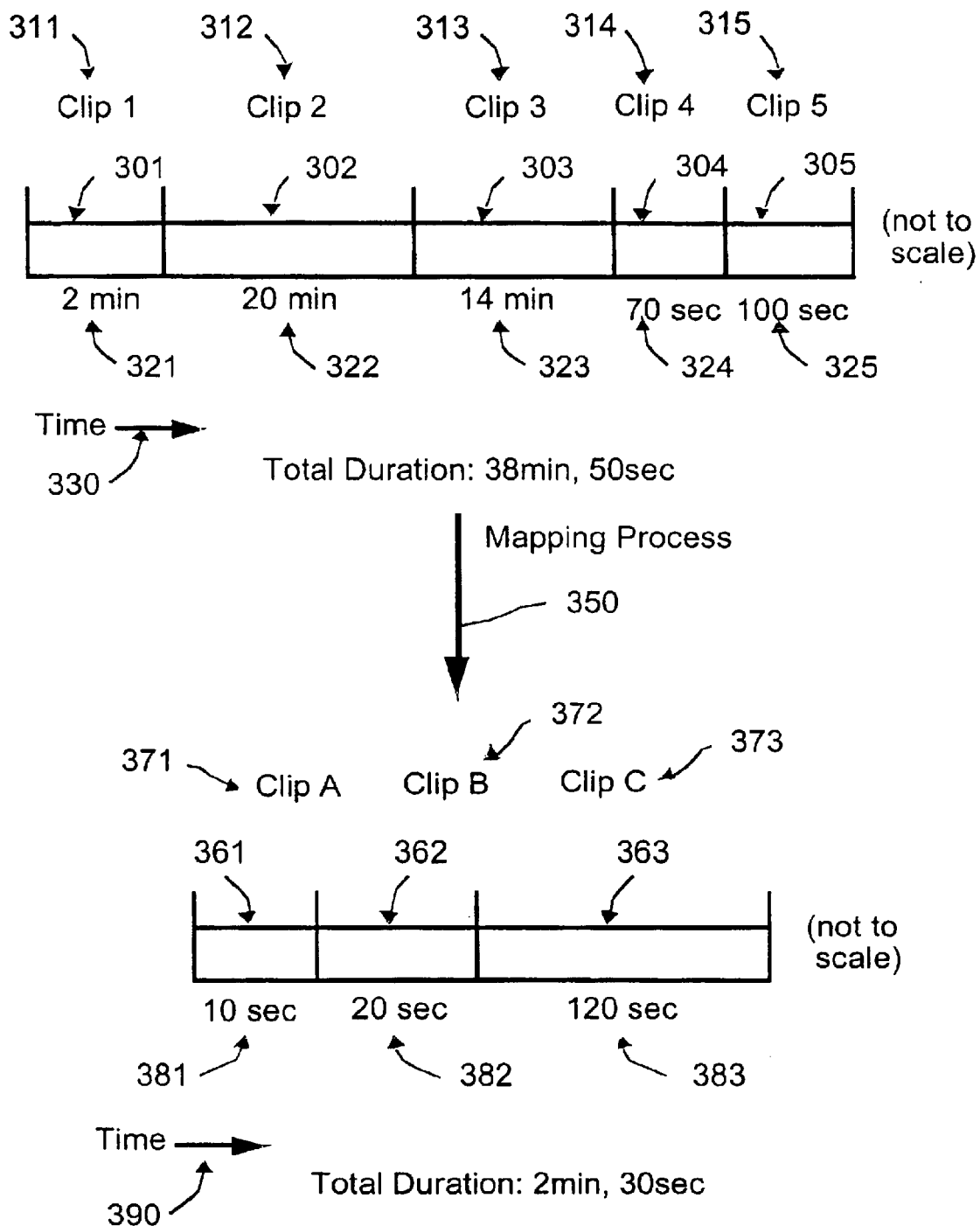
FIG. 3 show a second example of a temporal structure mapping process.

More complex mapping processes, 250, are possible, potentially yielding better results, or a greater probability of better results than the first example already described. For instance, a second example, shown in FIG. 3, may involve more knowledge of the temporal structure of the input content, 111, in the mapping process, 250, to yield a better result, 112, or an improved probability of a better result at 112. For instance, when the automatic system applies selection and extraction step 401 to the input content in FIG. 3, it may have the benefit of some information about the temporal structure of the input content. In FIG. 3 an example temporal structure is shown in which the input content comprises five consecutive portions, 301, 302, 303, 304, 305, labelled Clip 1, Clip 2, Clip 3, Clip 4, and Clip 5, respectively. Information concerning the duration of these clips may be available with the input content or may be measured in standard ways by the automatic system. The selection and extraction step, 401, now has the opportunity to perform one or more of a variety of functions or algorithms utilising this available or measured temporal structure information to select and extract a portion or portions from the input content. A list of preferred examples for selection and extraction step 401 are given in FIG. 8 and these are provided without restriction on the possible methods of performing step 401. A selection and extraction step may be obtained from FIG. 8 by combining any example from each column, of which, not all combinations need be useful. Step 402 of the mapping process, 250, may provide a greater variety of ordering methods and/or greater predictability or control of ordering methods if access to information about the temporal structure of the input content, 111, is available and/or if information about the temporal attributes of the selection and extraction process 401 relative to the temporal structure of the input content is available. The ordering step, 402, now has the opportunity to perform one or more of a variety of functions or algorithms utilising this available or temporal structure information to order portions previously selected and extracted from the input content. A selection of preferred examples for ordering step 402 are listed in FIG. 9 and these are provided without restriction on the possible methods of performing step 402. Step 403 of the mapping process, 250, may provide a greater variety of assembly methods and/or greater predictability or control of assembly methods if access to information about the temporal structure of the input content, 111, is available and/or if information about the temporal attributes of the selection and extraction process 401 relative to the temporal structure of the input content is available and/or if information about the ordering process 402 relative to the temporal structure of the input content is available. The assembly step, 403, now has the opportunity to perform one or more of a variety of functions or algorithms or assembly methods utilising this available or temporal structure information to assemble portions previously selected and extracted from the input content and consequently ordered. A selection of preferred examples for assembly step 403 are listed in FIG. 10 and these are provided without restriction on the possible methods of performing step 403.

In the simplest of mapping process methods, 250, related or synchronised or coincident audio and video data, for example, may be treated similarly. However, there are known techniques, some of which may be automated, in the movie-making and video-making industries for treating audio near video transitions or vice-versa to retain or obtain best quality results and these techniques may be employed in mapping process 250.

Following structure mapping, 102, is effects mapping, 103, in FIG. 1. The output content, 112, from the structure mapping process, 102, has effect mapping performed automatically on it, resulting in output content, 113. In the simplest case, effects mapping, 103, may be the identity case, in which the input content, 112, is unchanged and output at 113. Typically, however, one or more of a variety of effects may be automatically applied at 103, to either or both the audio and video content, for example, within content 112. These effects may include processes or functions or algorithms well-known in the art and FIG. 11 provides an example list of effects. A variance in the order in which effects are applied to the same content typically results in different output content and therefore, the particular ordering of effects applied to content 112, may also be considered an effect. Effects may be applied without knowledge of the temporal structure mapping process nor of the input content's temporal structure at 111, in which case it may be typical to apply an effect uniformly to the whole content at 112. Alternatively, some effects may be applied with knowledge of the input content's temporal structure, or with knowledge of the temporal mapping process at 102, and typically, such effects may be applied to a portion or portions of the content, 112.

In the first embodiment, temporal mapping and effects mapping are, or may be, applied automatically to input content to produce output content that may have poor features reduced or improvement of quality or both for the purpose of improving the perceptual experience of a viewer or viewers. The first embodiment describes said example or examples in which minimal information is available to the embodiment about the input content, amounting to information about the content's total duration or perhaps information about the content's segmentation and clip duration and sequence (or chronology) and without direction or input or control by the user other than to select the entirety of the input content for application to the embodiment. Furthermore, the first embodiment of the invention may not include user control of, or selection of, temporal structure mapping functions or parameters nor of effects mapping functions or parameters. Further, the specific temporal mapping function or functions and effects mapping functions exercised by the embodiment may be automatically selected without user control and without the benefit of additional, extra or external information or analysis concerning the content and yet the embodiment is capable of producing successful results as may be perceived by a viewer of the output content, 113. This fact is a likely result of the expectations and critical faculties and the like of the viewer as applied to the output content. Thus, it may be said that the first embodiment of the invention effectively provides a random and largely unrelated set of temporal structure mapping and effects mapping processes for application to input content with some probability of the output content being perceived as improved or reduced of poor features by a viewer.

The temporal mapping process and the effects mapping process may be described as being, or as being part of, or as obeying rules or rule-sets where the rules or rule-sets may include these properties or relations or information or entities: explicit declaration or implementation or execution of functions or algorithms or methods for performing the structure mapping and/or effects mapping processes and potentially other processes; references to said functions, algorithms or methods, where the actual functions or algorithms or methods may be stored elsewhere, such as in a computer system memory or on a medium such as a hard disk or removable medium or even in another rule-set; possible relations or associations or attribute or parameter passing methods for controlling or specifying information-passing or dependencies between functions or algorithms or methods or even between rules or rule-sets; rules or rule-sets specifying methods of selecting which temporal structure mappings and effects mappings will be executed or implemented in any particular application of the embodiment; ordering and/or repetition information for the application of mappings or of rules or rule-sets; heuristics information or information derived heuristically for direction or control of any portion of said rule-set and related information.

A collection of rules or rule-sets and any of the aforementioned properties or relations that may be included in or with a rule-set may be collectively described as a template. The act of application of the embodiment to input content, as previously described by means of application of temporal mapping or mappings and/or effects mapping or mappings to said input content and the associated relations or dependencies between these mappings, may be described as application of a template identically describing said application of said mappings and rules or rule-sets to input content to derive said output content.

A further example of the first embodiment involves application of the template to multiple input content to achieve one output content. Various types of input content may be accepted including audio, video, graphics, still images, clipart, animations, video keyframes or sequences thereof, mattes, live video source, for instance from a camcorder or DVCamcorder, or multiple sources of each of these, or combinations of these per input content source. In this example, the embodiment, for the purposes of the mapping processes, may treat each input content as a portion of the sum of the entire input content applied. Further, this embodiment of the invention may or may not have information about the relative sequence or chronology of some or all of the multiple input content sources, if this is relevant or practical. Several practical applications of this example exist, including a personal content display device, perhaps mounted as an electronic picture frame in which images or video and/or audio, etc may be displayed automatically by the embodiment. In this application, the input content may have been previously stored in a memory or on media such as a hard disk drive. Another practical application for this embodiment of the invention may be as an entertainment device for social occasions such as for parties, in which the embodiment may display output processed from multiple input content sources, possibly including live audio and video sources for public or social enjoyment. The input content may have been previously selected by the user to be suitable for the social occasion and the template or templates executed by the embodiment, including any sequencing or execution instructions pertaining to the templates themselves, may also have been preselected by the user.

Second Preferred Embodiment of the Method

The template definition made in the first embodiment may be extended to include the capability to store and convey and execute or direct the execution of a set of rules and associated information and content and functions, mappings and algorithms, or any combination or repetition or sequence thereof, where said rules and associated information, etc may have been created or defined or arranged by or created or authored under the direct or indirect control of an expert or experts or any person or persons skilled or experienced in the art or arts of multimedia presentation, movie-making, video production, audio production, or similar. The purpose of such a template or templates is to convey and/or control the production or presentation or post-production of input content (single or multiple) provided by a user in order to deliver output content which may be perceived by a viewer as comparably positively improved or reduced of some negative aspects with respect to the unmodified input content (single or multiple). Such a template or templates may contain heuristics, expert systems, procedural rules, script or scripts, parameters, algorithms, functions, provided content including at least all types of input content previously described, or references to any of these, or even merely data parameters used to setup a machine or system equivalent to the embodiment. Said template or templates may also include information in the form of text, graphics, video, audio, etc capable of describing or approximately describing the action or intent of the template or of the template author to a user in order to allow said user the opportunity to make a selection of, or between, one or more templates.

A practical purpose for said template or templates may include, for example, the processing of input content to create the appearance of a typical professionally-made video or movie from the content output by the embodiment. Similarly, it may be desirable to create a mood, or genre, or look, or other emotional or perceptible effect or feeling in content output by the embodiment from input content which does not include said mood, or genre or look, or other emotional or perceptible effect or feeling or not to the same degree, in the opinion of the user or the viewer, or both. Typically, post-production, or making of a video or movie requires team-work & a variety of skills for the capture process (acting, directing, script-writing, camera direction, etc) and for the post-production process (editing, directing, graphic-arts, music composition, etc). Typically this skill-set is unavailable to consumers and business people who may commonly use a camcorder, DVCamcorder, still-image camera, audio recorder, or the like. Portions of this team-work and skill-set may be compiled into a template form and made available to users of the embodiment in said template form. Since the input content has often already been captured, therefore reducing or limiting the ability of the embodiment, under control of the template, to affect the capture process, the skill-set contained or described or compiled within the template is, in that instance, typically limited to controlling, directing or executing application of the embodiment to the post-capture process, as indicated in FIG. 1, wherein the said template or templates may replace or control or direct or execute or do any combination of these for the mapping processes 102 and 103. In other cases, however, a portion of the input content may not already have been captured. In this instance, that portion of the input content can be live, and the template can operate on, or with, or in conjunction with that live portion of input content. The extent of processing in relation to "online" content depends on the extent of processing power available in the embodiment.

Figure 5:
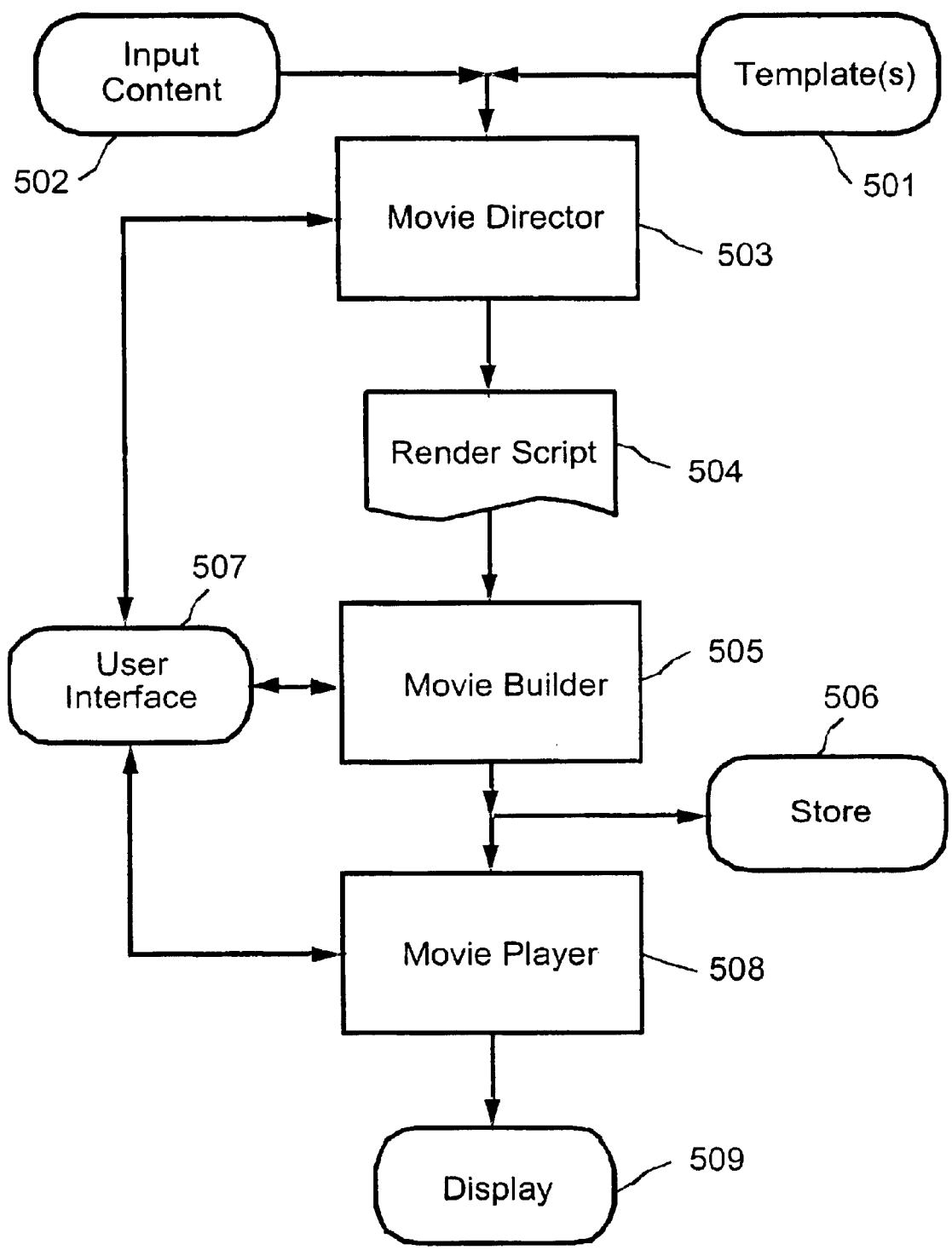
FIG. 5 illustrates an application relating to post production processing.

FIG. 5 indicates the second preferred embodiment of the invention in which said template or templates may be used to control or direct or execute processing of input content in a manner equivalent to or derivative of typical movie or video or audio or musical or multimedia post-production techniques in order to produce output content that may be perceived by a viewer as positively improved or reduced in negative aspects. Movie Director, 503, receives an input template or templates, 501, and input content (singular or plural), 502. In this preferred embodiment, input content, 502, will typically include synchronised, parallel or coincident video and audio content such as delivered by a camcorder or DVCamcorder device, or still images or graphical content, or music or other audio content. Input content, 502, will also typically include information about the input content, also known as metadata, that may specify some temporal structure information concerning the input content. In this second embodiment it is assumed that the said information about the temporal structure of the said input content is similar in type and quantity to that described in the first preferred embodiment.

Movie Director, 503, analyses the rules and other elements contained within template(s) 501 and constructs a series of instructions, 504, suitable for interpretation and/or execution by movie builder 505. The series of instructions, 504, in the form of a render script, typically also containing aspects of an edit decision list (EDL), is compiled by the movie director, 503, to typically also include references to input content, 502, and also possibly references to content provided by the template(s), 501, and possibly also references to other elements or entities including functions, algorithms, and content elements such as audio, music images, etc, as directed by the template(s), 501. Typically, template(s) 501, will direct the movie director, 503, to select and describe one or mappings for structure or effects to be applied to the input content, 502, or to said other provided or referenced content. Typically the template(s), 501, may have insufficient information for the movie director, 503, to resolve all references concerning the input content, 502. Typically, these unresolved references may be due to insufficient information to determine which of the input content is to be operated on by the embodiment, or the location of the input content, or similar issues. Movie Director, 503, may obtain sufficient information to resolve these issues by requesting or waiting for input by a user via a user interface, 507. Typical input at 507 may include selection of one or more input content items or selection of portions of content to be made available at 502 as input content, or selection of points of interest within content to be made available as metadata information to movie director 503. Movie director 503, using information sources, 501, 502, 507, outputs a render script, 504, with all references resolved within the system so that Movie Builder, 505, may find or execute or input the entirety of the referenced items without exception.

Movie builder 505 may typically execute or obey render script 504 directly, as typically, movie director, 503, has been designed to output the render script, 504, in a format suitable for direct execution by movie builder 505. Movie builder 505 may read and execute render script contents, 504, in a series-parallel method, as is typically required for video and audio parallel rendering or post-production. Additionally, movie builder 505 may execute or obey render script 504 by any reasonable method that will yield the expected result, or the result intended by the author of template(s) 501. Movie builder 505 may typically be or include a video and audio renderer such as Quicktime 3.0®, a product of the Apple® Corporation, or equivalent. Movie builder 505 may also be or include a hardware renderer or a combined hardware and software renderer and may be capable of realtime operation if a particular application of the embodiment so requires it. It may be noted that a difference between the first embodiment and the second embodiment, as is visible when comparing FIG. 1 and FIG. 5 is that in the first embodiment in FIG. 1, the mapping processes may execute without first compilation and resolution of references, whereas in the second embodiment, the rendering processes, which include the mapping processes of the first embodiment, may be executed following compilation of a render script derived from a template and following resolution of references. Movie builder 505 may typically include or provide any or all of the video or movie or multimedia or audio editing and effects and related functions, algorithms, etc for execution according to the method, order, sequence, etc instructed by the render script 504 and as intended or directed by the template 501. Movie builder 505 renders, edits, or otherwise modifies the input content, 502, and provided content (portion of 501) or other referenced content (possibly present in the system), according to the instructions, sequence, and referenced functions, etc included in render script 504 and outputs the completed production to, optionally, either or both of 506, a storage element, or 508, a movie player. The storage system, 506, may be used to store the production indefinitely, and may be a device including a camcorder, DVCamcorder, or hard disk drive, or removable medium or remote storage accessible via the internet or similar or equivalent or a combination of any of these wherein the output production may be partially stored on any or all of these or may be duplicated across any or all of these. Store 506 may optionally store the output production and does not restrict the possibility of the output production being played and displayed immediately by movie player 508 and display 509, nor does store 506 limit the possibility of movie builder 505 being capable of rendering in realtime and also playing the output production, in which case movie builder 505 and movie player 508 may be the identical component within the system of the embodiment. User interface 507 may also provide user control of movie builder 505 or of movie player 508, if desired, to allow control of features or functions such as starting of execution of movie builder 505 or starting of playing by movie player 508, or stopping of either 505 or 508 or both. User interface 507 may also permit a user to specify the location of store 506, if it should be used or other related options. Movie player 508 may be or include Apple® Quicktime® 3.0 renderer or any other equivalent or similar movie player.

A specific example of an application of the second embodiment described in FIG. 5 provides for the application of a Silent Movie template, via the system described in FIG. 5, to a user's input content to produce output content that may be perceived by a viewer to be similar to or to evoke feelings of or impressions of the silent movie genre or style of movie or film. Said Silent Movie template includes rules or relations between separate mapping processes, said rules or relations being intended to group or direct the production of a particular perception or feeling within the content output from the system in FIG. 5. Said rules or relations may include passive relations or grouping of mapping processes by the method of including said processes within a single template and excluding other unwanted processes. Further, said relations between mapping processes, etc may be active, being rules or similar and capable of being executed or operated or decided during execution of the system in FIG. 5.

Said Silent Movie template may include a typical set of template components listed in FIG. 12 There may be many ways to construct a template or to apply or order its components to achieve an equivalent result to that of the Silent Movie production and the example in FIG. 12 is not limiting on these many construction methods or options or orderings or applications. Said Silent Movie template example in FIG. 12 may be considered as an example of passive relationships between template components to achieve an overall production and consequent perception, as previously described. Many of the components listed in FIG. 12 may alone typically elicit some perception of the Silent Movie genre, but the combination or sum of these elements being coincident in one template and their sum effect on the input content result in a consequently strong perceptual reference or allusion to the Silent Movie genre.

FIGS. 14A–14C include an example implementation of the Movie Director module, in pseudo-code. FIGS. 15A and 15B include an example implementation of the Movie Builder, also in pseudo-code. FIGS. 16A and 16B include an example template implementation, also in pseudo-code. The template in FIGS. 16A and 16B have been designed to create a fast-paced, fast-cutting production with a fast-beat backing music track to give the impression of an action movie. When the example in FIGS. 16A and 16B is compared with the previous Silent Movie genre template description the versatility of the invention may recognized.

FIG. 13 provides example associations between editing & effect techniques and template type, where each template type is intended to induce or suggest one or more moods or is intended for application to input content of a particular kind or relating to a particular event type.

Templates need not be fixed, nor entirely previously authored. A template or templates may be modified through various means as part of the method of the embodiment, including: inclusion of user-preferences; direct or indirect user-modification; inclusion of information or inferences derived from information about input content; modification by or in conjunction with another template or templates; modification or grouping or consolidation or composition by a meta-template; template customization. Modification of a first template, in conjunction with a second template can be facilitated by using standardised naming of template elements or parameters and, or in addition to standardised structuring of template information.

FIGS. 16A and 16B provide an example of standardised naming of template parameters and elements, e.g. 'cut_order' and 'intraclip'_spacing. Incorporation of standard names of this kind, or use of a format, structure or model inferring element and parameter names or identities, facilitates template modification. For example, the template in FIGS. 16A and 16B might be modified by direct means (manual or automatic) through searching the template information for a name or inferred element identity, and then replacing the related value text string, reference or other attribute associated with that name (if any).

Another example of template modification, again with reference to FIGS. 16A and 16B, involves replacement or swapping element values or attributes between like-elements in different templates. For example, if a user, through direct or indirect means, indicates a preference for a 'Random' cut_order property from a differing template, but otherwise prefers all of the properties of a "Romantic" template, then the 'chronological' cut_order property in the Romantic template could be replaced by the 'Random' property from elsewhere.

Yet a further example of template modification involves prioritisation or weighting, of template elements to indicate their value to, or their influence on the overall impression of the template. This information, which is effectively template metadata, can be used to control, or coordinate, user or automatic template modification. The information can thus enable judgements to be made as to the effect and potential desirability of particular modifications to a template.

The method of the embodiment may support a meta-template which is capable of acting on a collection of templates, including functions such as: selection of template (s) based on criteria such as information about input content, user preferences, etc; modification, grouping, consolidation or composition of a group of templates; customization of one or more templates, typically under specific user control.

The method of the embodiment, through design and provision of suitable templates, may be used to provide a presentation or album function when applied to, or operating on input content and/or content provided with a template.

Third Preferred Embodiment of the Method

The previous embodiments may be further enhanced or extended by the inclusion of user-interactivity or user input or user preferences or user setup or user history or any of these. It is especially preferred that templates include the capability for requesting user input or preferences, or of requesting such information or interaction directly or indirectly, and be able to include such information in decision-making processes such as the aforesaid rules, in order to determine, or conclude or infer and execute, apply or direct a production including at least some of the preferences or desires of the user.

At its simplest, user interaction or control may include selection of a template or templates and selection of input content (single or multiple) for application, execution or direction of the former to the latter to output a production.

Of particular interest is the opportunity for the embodiment, and of the template(s) therein, to utilize or enquire of the user's potential knowledge of the input content to presume or infer the best application, execution or direction of the template to said input content. This user-interaction and presumption or inference may be inplemented in a variety of methods, including the simultaneous implementation of several alternative methods. The kinds of knowledge of the input content that may be obtained include: user preference for, neutrality towards or dislike of one or more input content segments; user preference for or dislike of point or points within input content segments; user preference for, neutrality towards or dislike of similarly-labelled sections of input content, for instance, where a database of labelled or partially labelled input content may be accessible to the embodiment; user approval or disapproval of an output production or portion or portions thereof.

Figure 6A:
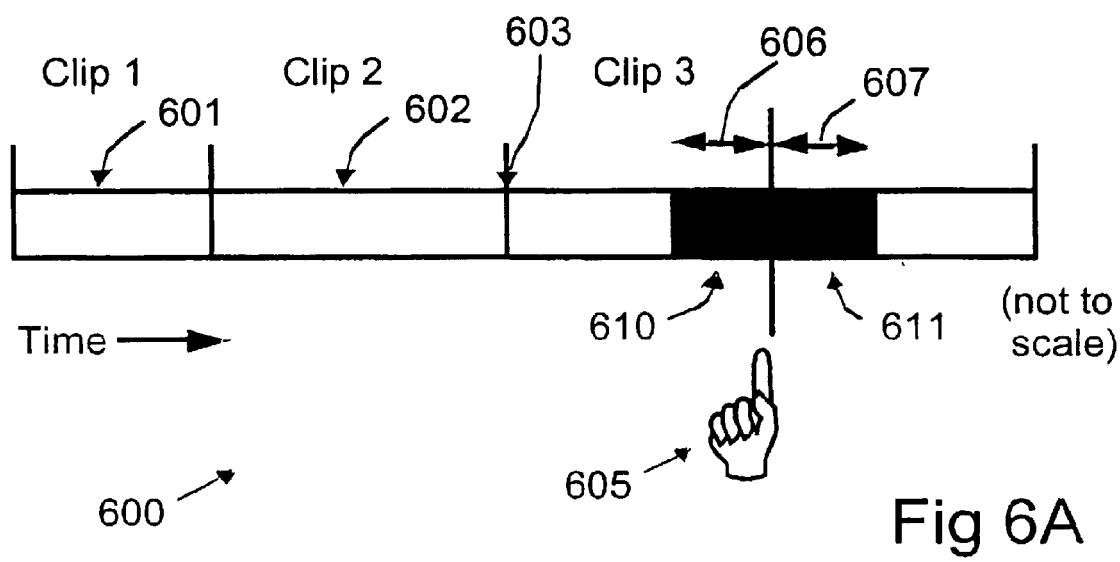
FIGS. 6A and 6B illustrate incorporation of user-interaction.

FIG. 6A. indicates in 600, a possible method of obtaining knowledge of input content from a user. The user may be asked or prompted to indicate highlights or emotionally significant or otherwise important portion or portions of input content. One method of implementing this interaction is to allow the user to indicate a point of significance, 605, and the embodiment, typically through the application of rules within the template(s) may infer zones, 610 and 611, before and after the point of interest that may be selected and extracted for inclusion in the production and application by the template. Typically, the durations, 606, 607, of the zones of interest, 610, 611, around the indicated point, 605, may be determined or defined or calculated within the template, typically by authored heuristics indicating the required or desired extracted content length for any time-based position within the output production.

Figure 6B:
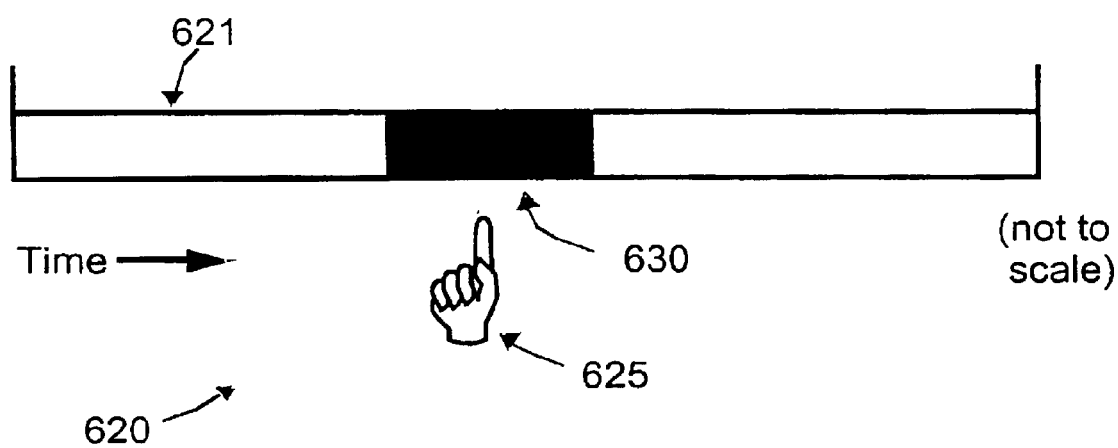

FIG. 6B. indicates, 620, a possible method for a user to indicate approval or disapproval of portion or portions of the output production, 621. The user may indicate a point of approval or disapproval, 625, and this point information may be inferred to indicate an entire segment of the output production, 630, said segment typically being extrapolated from said point by means of finding the nearest forward and backward content boundaries (transitions) or effects, or by applying a heuristically determined timestep forward and backward from 625 that typically relates to the temporal structure of the output production.

User interaction may also permit direct or indirect alteration or selection of parameters or algorithms or rules to be utilised by the template(s) by means including: selection of numerical values for quantities such as clip duration, number of clips, etc; indirect selection of clip duration or temporal beat or number of clips through selection of a particular template with the desired characteristics or through indicating preference for the inclusion of a particular clip of a known duration, therefore potentially overriding template rules relating to selection of such content; selection from a set of style options offered by a template as being suitable (said suitability typically being determined heuristically or aesthetically and authored into said template); selection of a method or methods, such as a clip selection method preferring to select content from a localised region of the input content. A template may provide means and especially rules for requesting all such information or options or preferences or for indirectly requesting said information or for allowing user-selection of said information. A template may not require said information but may assume defaults or heuristics, etc unless said information is offered, or directed by the user. The act by a user of selecting a template may define or determine some or all of said options or parameters or selections by means of defaults or default methods being within said template.

A template may offer a user a hierarchical means or other equivalent or similar means for selecting, modifying or controlling or specifying parameters, methods, etc. Said hierarchical means of permitting or requesting user input may be implemented by initially requesting or offering generalisations for the production, for instance, the template selection may be the first generalisation, eg. selection from a wedding production template or a birthday production template. A next level of hierarchical selection may be the choice of a church wedding or a garden wedding production within the template. Said choice may effect a change to styles and colours or music or related rules and methods within the template. A next level of hierarchical selection may be the choice of music or styles within a segment of the production relating to a particular input content segment. Thus, if the user is willing or interested or skilled enough to wish to specify detailed control of a production and the directing template then a hierarchical method may be appropriate for permitting such control where it is requested or required without demanding or enforcing the same level of detailed control for the entirety of a production where it may be unnecessary or undesirable.

Further examples of user input to or control of or interaction with template rules include: choice of long, medium or short temporal structure mappings; choice of clip durations; choice of backing music; inputting text information into generated titles or dialogue mattes or credits or similar; selection of clipart or effects or styles from a range of options offered or referenced by a template or system. Some specific user control examples relating to the template examples already described include: optional chroma bleed-in at a selected point within the Silent Movie production to obtain the benefit of colour after the mood has first been set by the effects; textual input to dialogue mattes within the Silent Movie template example and also into the titles and end titles in the action template example. A further example of interaction with a user includes storyboard interaction in which the embodiment, and desirably a template(s) may include and display features of a storyboard, including images, representative images, icons, animation, video, a script, audio, etc to convey properties and organisation of the template and/or production to a user to permit or enable easy comprehension, to assist or guide the user and to permit or enable easy modification, adjustment, editing, or other control of the embodiment and/or the output production by the user.

User preferences, historical selections or choices, name, and other information may also be recalled from previous use and storage, etc to be utilised by template rules or as elements within a production (eg. as textual elements in titles, etc). Also, previously created productions, previously utilised or modified templates, previously utilised or selected input content, or groups of these may be recalled for subsequent use as input content or preferences or templates, etc.

Fourth Preferred Embodiment of the Method

A fourth embodiment of the invention is also capable of using information about the input content in order to: select or adjust appropriate items or parameters to suit or match or fit the mood of the subject or other property of input content, be said input content any of audio, video, still-frames, animation, etc; advise, prompt or hint to the user a selection, choice, single option, alternative, parameter range, style, effect, stricture, template, etc, for the user to operate on.

This said capability of the embodiment to use information about the input content may be used, engaged or activated in conjunction with any of the previously described embodiments or examples of the invention in any reasonable combination of functions or features.

The information about the input content may be obtained from an external source, such as a DVCamcorder, for instance, Canon model Optura, which is capable of performing some content analysis during recording of said content. Said external source may provide said information, also described as metadata, from content analysis or a recording of results from an earlier content analysis operation, or metadata may be supplied from other information also available at the time of recording the content. Such other information may include lens and aperture settings, focus information, zoom information, and also white balance information may be available. Information made available by said external source may include motion information, for instance, the said DVCamcorder is capable of providing motion information as part of its image encoding method and this information may be extracted and used for other purposes such as those described for this embodiment. Further examples of other information that may also be available from the external input content source include: time, date or event information, for instance, information describing or referencing or able to be linked to a particular event on a particular day such as a sporting event; locality or geographical information, including GPS (Global Positioning System) information.

The embodiment may also be capable of analysing input content and providing its own information source or metadata source. Such analyses may be performed to obtain metadata including these types: audio amplitude; audio event (loud noises, etc); audio characterisation (eg. identifying laughter, voices, music, etc); image motion properties; image colour properties; image object detection (eg. face or body detection); inferred camera motion; scene changes; date, time of recording, etc; light levels; voice recognition; voice transcription; etc.

The more that the embodiment is capable of inferring about the subject or action or other details of a scene or event recorded within input content then the more capable the embodiment may be to perform template functions, including: searching, selection and extraction of clips from input content, for instance, to find events of interest or appropriate to the mood of the applied template; to infer relationships between portions of input content and to maximise benefits from these through control of clip-adjacency, chronology, subject selection frequency, etc; to infer the subject of input content in order to select an appropriate template, or function or effect within a template; to select appropriate transition properties, eg. colour, speed, type, based on information about the input content such as colour, motion and light level.

The embodiment may also include the capability to access and search input content by means of labels applied to or associated with or referencing the input content. Said labels may have been applied by the embodiment itself or by any other source. Said labels may be applied in patterns to label portions of input content according to any rule method required or appreciated by the user or by any source acting on the user's behalf or under the user's instructions. Thus, an input content section may contain labels describing specific subjects within the content, such as the user's family, and the embodiment may utilize these labels to select or avoid selecting said labelled portions based on instructions provided to the embodiment. Said instructions need not be provided directly by a user. For example, the user may select a template which has been previously defined, and is declared to the user through an appropriate mechanism, eg. the template name, to select for family snapshots or video clips. Said family snapshot template may include reference to a labelling scheme which permits it to interpret the labels previously placed on or associated with the input content, therefore the embodiment need not require direct user action or control concerning the labelled input content. The embodiment may support the user's optional wish to override or modify the labels, thereby allowing control of the current production process and possibly of future production processes if permanent modifications are retained for the labels.

Preferred Embodiments of Apparatus

The method of multimedia editing is preferably implemented in dedicated hardware such as one or more integrated circuits performing the functions or sub functions of the editing. Such dedicated hardware may include graphic processors, digital signal processors, or one or more microprocessors and associated memories. An apparatus incorporating the aforementioned dedicated hardware can be a device (for example a DVCamcorder or other device) having random access storage, and replay capability, plus at least some editing, and possibly effects capability. The DVCamcorder has, in addition, a communications capability for exchange/transfer of data and control/status information with another machine. The other machine can be a PC running a control program such as a template having the user interface. The PC and DVCamcorder can exchange video/audio data, as well as control and template instructions. The machines can operate in a synchronous, or asynchronous manner as required.

Figure 7:
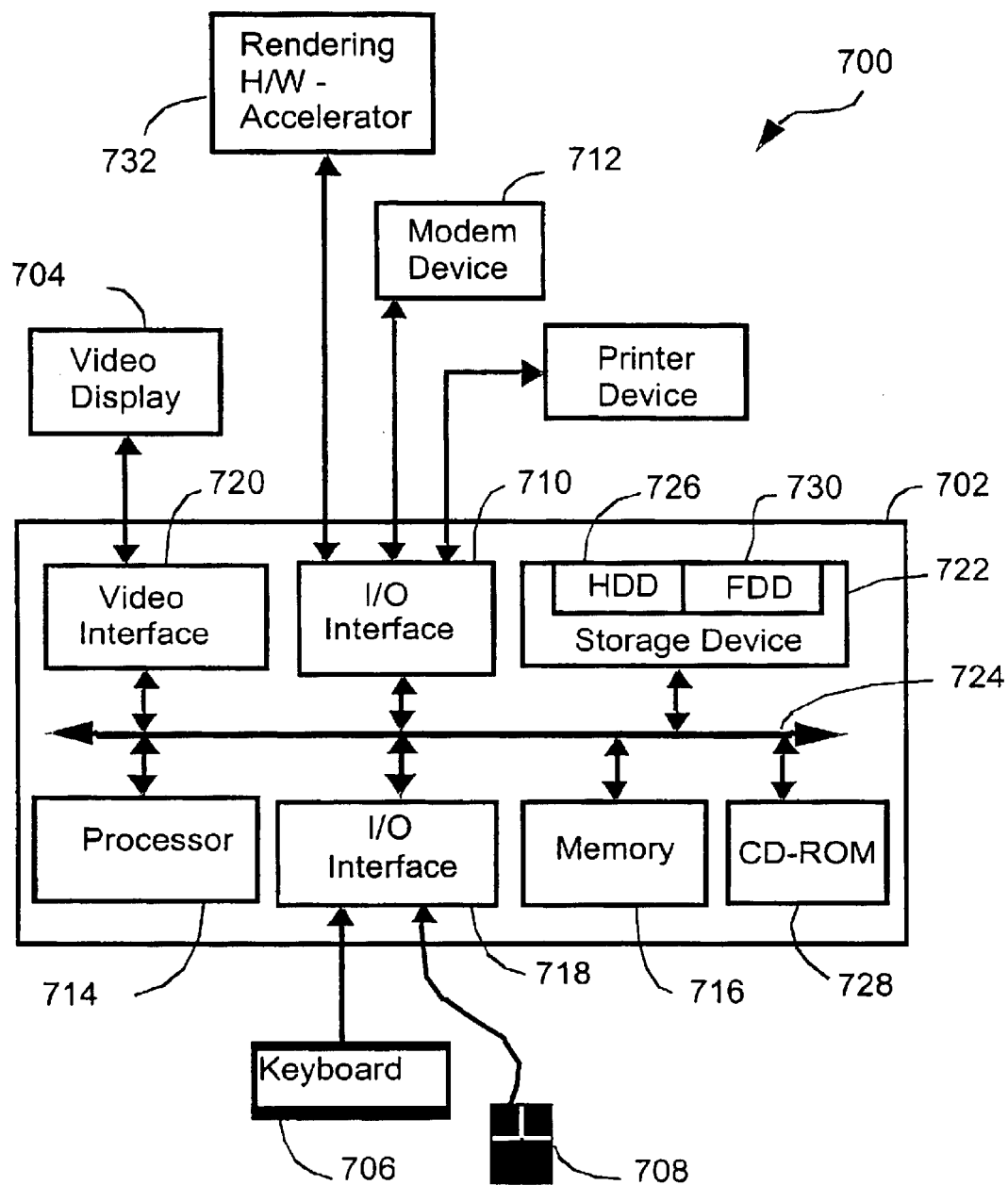
FIG. 7 depicts a preferred embodiment of apparatus upon which the multi-media editing processes may be practiced.

The multi-media editing processes are alternatively practiced using a conventional general-purpose computer, such as the one shown in FIG. 7, wherein the processes of FIGS. 1 to 6 are implemented as software executing on the computer. In particular, the steps of the editing methods are effected by instructions in the software that are carried out by the computer. The software may be divided into two separate parts; one part for carrying out the editing methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for multi-media editing in accordance with the embodiments of the method of the invention.

The computer system 700 consists of the computer 702, a video display 704, and input devices 706, 708. In addition, the computer system 700 can have any of a number of other output devices including line printers, laser printers, plotters, and other reproduction devices connected to the computer 702. The computer system 700 can be connected to one or more other computers via a communication interface 710 using an appropriate communication mechanism such as a modem communications path, a computer network, or the like. The computer system 700 can also be optionally connected to specialised devices such as rendering hardware or video accelerators 732 by means of communication interface 710. The computer network may include a local area network (LAN), a wide area network (WAN), an Intranet, and/or the Internet.

The computer 702 itself consists of one or more central processing unit(s) (simply referred to as a processor hereinafter) 714, a memory 716 which may include random access memory (RAM) and read-only memory (ROM), input/output (IO) interfaces 710, 718, a video interface 720, and one or more storage devices generally represented by a block 722 in FIG. 7. The storage device(s) 722 can consist of one or more of the following: a floppy disc, a hard disc drive, a magneto-optical disc drive, CD-ROM, magnetic tape or any other of a number of non-volatile storage devices well known to those skilled in the art. Each of the components 720, 710, 722, 714, 718, 716 and 728 is typically connected to one or more of the other devices via a bus 1024 that in turn can consist of data, address, and control buses.

The video interface 720 is connected to the video display 704 and provides video signals from the computer 702 for display on the video display 704. User input to operate the computer 702 is provided by one or more input devices. For example, an operator can use the keyboard 706 and/or a pointing device such as the mouse 708 to provide input to the computer 702.

The system 700 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinbefore, are resident as software or a program recorded on a hard disk drive (generally depicted as block 726 in FIG. 7) as the computer readable medium, and read and controlled using the processor 714. Intermediate storage of the input and template data and any data fetched from the network may be accomplished using the semiconductor memory 716, possibly in concert with the hard disk drive 726.

In some instances, the program may be supplied to the user encoded on a CD-ROM 728 or a floppy disk 730, or alternatively could be read by the user from the network via a modem device 712 connected to the computer, for example. Still further, the software can also be loaded into the computer system 700 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

What is claimed is:

1. A method of processing a plurality of time-based video content items into a description of an output production, the method comprising the steps of:

deriving an attribute characterizing a duration of at least one of the time-based video content items from meta-data of the time-based video content item;

operating upon the attribute using a pre-defined template to establish an editing process, said editing process including a temporal mapping process and an effects mapping process, said operating step determining the temporal mapping process in accordance with the attribute; and applying the editing process to at least one of the time-based video content items and a description of the time-based video content items to thereby form the description of an output production, wherein the applying step is performed prior to presenting any information depending upon the description of the output production.

2. A method according to claim 1, wherein the applying step comprises sub-steps of:

first applying the temporal mapping process to the time-based video content items to produce a preliminary description comprising modified temporally structured data, and second applying the effects mapping process having regard to the preliminary description to produce the description of the output production.

3. A computer-based method of editing time-based video content to form a description of an output production, the method comprising the steps of:

selecting a plurality of time-based video content items;

selecting a pre-defined template;

deriving an attribute characterizing at least one of said time-based video content items;

defining a computer-based editing process dependent upon the attribute and the pre-defined template; and applying the computer-based editing process to at least one of the time-based video content items and a description of the time-based video content items thereby to form the description of the output production, wherein the applying step is performed prior to presenting any information depending upon the description of the output production.

4. A method according to claim 3, wherein:

the time-based video content is a data set comprising at least one of video data, still-image data and audio data;

the attribute characterizing the time-based video content comprises first meta-data derived from the data set and possibly further derived from second meta-data associated with the at least one data set;

the defining step comprises determining, depending upon the first meta-data, a set of instructions from the pre-defined template; and the applying step comprises applying the instructions to the data set to produce the description of the output production.

5. A method according to claim 4, wherein the instructions comprise a temporal mapping process and the applying step comprises:

applying the temporal mapping process to the data set to produce the description of the output production having a modified temporal structure.

6. A method according to claim 4, wherein the instructions comprise a temporal mapping process and an effects mapping process, and wherein the applying step comprises the sub-steps of:

applying the temporal mapping process to the data set to produce a preliminary description of an output production having a modified temporal structure; and applying the effects mapping process having regard to the preliminary description to produce the description of the output production having the modified temporal structure and a modified effects structure, wherein the steps of having the temporal mapping process and applying the effects mapping process can alternatively be performed in the reverse order.

7. A method according to claim 4, wherein the data comprises a live capture data set segment.

8. A method according to claim 4, wherein the step of determining the set of instructions comprises the sub-steps of:
   constructing, using the template and the first meta-data, a series of directions which refer to at least one of (a) segments of the at least one data set, (b) segments of the template, and (c) other information; and
   resolving the references thereby to compile the directions into the set of instructions.

9. A method according to claim 3, wherein the template is constructed using heuristic incorporation of experiential information of an expert.

10. A method according to claim 3, wherein the description of the output production is an EDL.

11. A method according to claim 3, wherein the information depending upon the description of the output production is the output production.

12. A method according to claim 3, wherein:
   the first selecting step includes selecting the plurality of time-based video content items according to a first order; and
   said computer-based editing process is capable of excluding at least one of the plurality of time-based video content items from the description of the output production.

13. A method according to claim 3, wherein:
   the first selecting step includes selecting the plurality of time-based video content items according to a first order; and
   said computer-based editing process is capable of arranging the plurality of selected time-based video content items in the description of the output production in a different order.

14. A method according to claim 3, wherein:
   the computer-based editing process is capable of cutting the plurality of selected time-based video content items into the description of the output production according to a cutting rhythm defined by the template.

15. A method according to claim 3, wherein the method further comprises the step of, prior to the defining step:
   receiving an editing command that does not include any of (a) a reference to an explicit startpoint or (b) the explicit startpoint, at which a said selected time-based video content item is to be inserted into the description of the output production; and
   wherein the computer-based editing process is dependent upon the selected plurality of time-based video content items and the pre-defined template and the editing command; and
   wherein the computer-based editing process is capable of determining dependent upon said editing command, at least one of (c) the reference and (d) the explicit startpoint at which said selected time-based video content item is inserted into the description of the output production.

16. A method according to claim 15, wherein the editing command designates a segment of a selected media content item for one of inclusion in and omission from the description of the output production.

17. A method according to claim 3, wherein the attribute comprises at least one of:
   a duration of a said content item;
   relative durations of at least some of the content items;
   the relative order of at least some of the content items;
   amplitude of an audio signal in a said content item;
   image motion in a said content item;
   presence of a particular image object in a said content item;
   inferred camera motion in a said content item;
   an inferred camera setting used in relation to capture of a said content item;
   a scene change in a said content item;
   the date of a said content item;
   the time of recording of a said content item;
   a light level in a said content item;
   presence of a particular voice in a said content item;
   presence of a keyframe in a said content item;
   metadata indicating a point of approval relating to a said content item; and
   metadata indicating a point of disapproval relating to a said content item.

18. A method according to claim 3, wherein the description of the output production is a memory based representation of the output production.

19. A computer-based apparatus for editing time-based video content to form a description of an output production, the apparatus comprising:
   capture means for capturing the time-based video content;
   selecting means for selecting a plurality of time-based video content items from the time-based video content;
   deriving means for deriving an attribute characterizing at least one of the time-based video content items;
   defining means for defining a computer-based editing process dependent upon the attribute and a pre-defined template; and
   applying means for applying the computer based editing process to at least one of the time-based video content items and a description of the time-based video content items thereby to form the description of the output production,
   wherein said applying means performs the applying prior to presenting any information depending upon the description of the output production, and
   wherein the deriving means, the defining means and the application means are housed on board the capture means.

20. An apparatus according to claim 19, wherein:
   the time-based video content is a data set comprising at least one of video data, still-image data and audio data;
   the attribute characterizing the time-based video content comprises first meta-data derived from the data set and possibly further derived from second meta-data associated with the at least one data set;
   the defining means are adapted to determine, depending upon the first meta-data, a set of instructions from the pre-defined template; and
   the application means are adapted to apply the instructions to the data set to produce the description of the output production.

21. An apparatus according to claim 20, wherein the determining means comprise:
   means for constructing, using the template and the first meta-data, a series of directions which refer to at least one of (a) segments of the at least one data set, (b) segments of the template, and (c) other information; and means for resolving the references thereby to compile the directions into the set of instructions.

22. An apparatus according to claim 19, wherein the template includes one or more of rules and references heuristically based upon experience of an expert.

23. A computer based apparatus for editing time-based video content to form a description of an output production, the apparatus comprising:

capture means for capturing the time-based video content;

selecting means for selecting a plurality of time-based video content items from the time-based video content;

deriving means for deriving an attribute characterizing at least one of the time-based video content items;

defining means for defining a computer-based editing process dependent upon the attribute and the pre-defined template; and applying means for applying the computer-based editing process to at least one of the time-based video content items and a description of the time-based video content items thereby to form the description of the output production, wherein said applying means performs the applying prior to presenting any information depending upon the description of the output production, and wherein the deriving means, the defining means and the application means are distributed between the capture means and an off-board processor.

24. An apparatus according to claim 23, wherein:

the time-based video content is a data set comprising at least one of video data, still-image data and audio data;

the attribute characterizing the time-based video content comprises first meta-data derived from the data set and possibly further derived from second meta-data associated with the at least one data set;

the defining means are adapted to determine, depending upon the first meta-data, a set of instructions from the pre-defined template; and the application means are adapted to apply the instructions to the data set to produce the description of the output production.

25. A computer readable memory medium for storing a program for apparatus for editing time-based video content to form a description of an output production, the program comprising:

code for selecting a plurality of time-based video content items from the time-based video content;

code for deriving an attribute characterizing at least one of the time-based video content items;

code for defining a computer-based editing process dependent upon the attribute and the pre-defined template; and code for applying the computer-based editing process to at least one of the time-based video content items and a description of the time-based video content item thereby to form the description of the output production, wherein the code for applying is performed prior to presenting any information depending upon the description of the output production.

26. A computer readable memory medium according to claim 25, wherein:

the time-based video content is a data set comprising at least one of video data, still-image data and audio data;

the attribute characterizing the time-based video content comprises first meta-data derived from the data set and possibly further derived from second meta-data associated with the at least one data set;

the code for defining comprises code for determining, depending upon the first meta-data, a set of instructions from the pre-defined template; and the code for applying comprises code for applying the instructions to the data set to produce the description of the output production.

27. A computer readable memory medium according to claim 26, wherein the code for the determining step comprises:

code for constructing, using the template and the first meta-data, a series of directions which refer to at least one of (a) segments of the at least one data set, (b) segments of the template, and (c) other information; and code for resolving the references thereby to compile the directions into the set of instructions.

28. A computer based method of editing time-based video content to form an output production, the method comprising the steps of:

selecting a plurality of time-based video content items;

selecting a pre-defined template;

deriving an attribute characterizing at least one of the time-based video content items;

defining a computer-based editing process dependent upon the attribute and the pre-defined template; and applying the computer based editing process to at least one of the time-based video content items and a description of the time-based video content items thereby to form the output production, wherein the applying step is performed prior to presenting any information depending upon the output production.

29. A method according to claim 28, wherein the information depending upon the production is the output production.

* * * * *

UNITED STATES PATENT AND TRADEMARK OFFICE
CERTIFICATE OF CORRECTION

PATENT NO. : 6,954,894 B1
DATED : October 11, 2005
INVENTOR(S) : James Anthony Balnaves et al.

It is certified that error appears in the above-identified patent and that said Letters Patent is hereby corrected as shown below:

Column 1,
Line 39, "postproduction" should read -- post-production --.

Column 11,
Line 31, "FIG. 12" should read -- FIG. 12. --.

Column 13,
Line 2, "inple-" should read -- imple- --.

Column 17,
Line 42, "Intemet" should read -- Internet --.

Signed and Sealed this

Seventh Day of March, 2006

JON W. DUDAS
*Director of the United States Patent and Trademark Office*